United States Patent [19]

Duin et al.

[11] 4,148,930

[45] Apr. 10, 1979

[54] MARGARINE

[75] Inventors: Hendrik J. Duin; Antonius F. van Dam; Johannes H. M. Rek, all of Vlaardingen, Netherlands

[73] Assignee: Lever Brothers Company, New York, N.Y.

[21] Appl. No.: 835,624

[22] Filed: Sep. 22, 1977

[30] Foreign Application Priority Data

Sep. 24, 1976 [GB] United Kingdom ............... 39815/76

[51] Int. Cl.$^2$ .............................................. A23D 3/00
[52] U.S. Cl. ..................................... 426/603; 426/613
[58] Field of Search ................ 426/583, 602, 603, 613

[56] References Cited

U.S. PATENT DOCUMENTS

| | | | |
|---|---|---|---|
| 3,887,715 | 6/1975 | Cante et al. ...................... | 426/602 X |
| 3,982,039 | 9/1976 | Scibelli et al. ...................... | 426/603 |
| 4,038,436 | 7/1977 | Smouse et al. ...................... | 426/603 |

*Primary Examiner*—Robert A. Yoncoskie
*Attorney, Agent, or Firm*—Michael J. Kelly; James J. Farrell; Melvin H. Kurtz

[57] ABSTRACT

The invention relates to margarines of improved frying properties, which follow from a reduction in spattering upon frying.

The improvement is achieved by incorporating in the margarines proteins of an increased proteose-peptone content.

The weight ratio of proteose-peptone:

proteinaceous material of an isoelectric point within the range of pH 4–6 is at least 0.5 : 1.

8 Claims, No Drawings

MARGARINE

The present invention relates to margarines of improved frying properties.

Margarine is a complex system essentially containing on the one hand a mixture of triglycerides which are either crystallized or non-crystallized at ambient temperature, and aqueous ingredients on the other hand. Minor ingredients, e.g. emulsifiers, flavours, colouring matter, vitamins etc. are dissolved or dispersed in either the fatty or the aqueous phase. Depending on the content of crystallized triglycerides in the fatty phase, the margarine is either pourable or more or less shape-retaining at ambient temperature. Since in conventional margarines the aqueous ingredients are dispersed in the form of small droplets in the fatty ingredients, margarines are generally water-in-oil type emulsions.

Upon melting, which takes place in the initial stage of the frying process, the margarine separates essentially into two layers, i.e. an oily and an aqueous layer. When the temperature is further increased, e.g above the boiling point of water, spattering may occur, since the water tends to escape from the bottom of the frying pan and entrainment of oily ingredients will thereby take place.

The present invention provides margarines comprising proteins in the aqueous phase, the weight ratio of proteose-peptone proteins to proteinaceous material of an isoelectric point within the range of pH 4-6 being at least 0.5.

In this Specification the term "proteinaceous material of an isoelectric point within the range of pH 4-6" includes non-proteose-peptone proteins of such an isoelectric point and organic nitrogen containing non-proteinaceous material, e.g. urea, peptides, etc. Consequently the percentage of "proteinaceous material of an isoelectric point within the range of pH 4-6" is $N \times 6.38$ minus percentage proteose-peptone, in which N is the percentage nitrogen determined by the Kjeldahl method (Z. Anal. Chem. 22, 366 (1883)).

Proteose-peptone is defined by the Committee on Mill Protein Nomenclature, Classification and Methodology of the Manufacturing Section of the American Dairy Science Association, as reported by Dyson Rose et al "Nomenclature of the Proteins of Cow's Milk: Third Revision" Journal of Dairy Science 53, 1-17 (1970), as that proportion of the milk protein system not precipitated by heating at 95° C. to 100° C. for 20 minutes and subsequent acidification to pH 4.7, but precipitated by 12% (weight/volume [W:V]) trichloroacetic acid. The proteose-peptone proteins have been found to account for about 8-25% of the whey- and/or serum proteins and about 2-6% of the total proteins in milk.

Conventional ingredients, e.g. phosphatides, phosphatide fractions and partial glycerides are preferably present as well.

Particularly phosphatides are of importance, since they effect a synergistic action on the proteose-peptone proteins in respect of anti-spattering action.

Suitably 0.05-1.0%, especially 0.1-0.6% phosphates are present.

Both animal and vegetable phosphatides can be used, e.g. the phosphatides derived from egg-yolk, soyabeans, rapeseed, maize etc.

Soyabean phosphatides are particularly preferred and both whole soyabean phosphatides (which may include up to about 30% of soyabean oil) and their fractionated or hydrolysed derivatives (e.g. those containing 15-35% of monoacylglycero phosphatides) can be used.

Preferably the previously mentioned weight ratio of proteose-peptone to non-proteose-peptone proteins in the margarines of the present invention is from 0.8 to 1.2. Particularly dairy proteins and especially proteins derived from cow's milk, more particularly proteins derived from cheese whey are used in the margarines of the present invention.

Suitably the margarines of the present invention are of a proteose-peptone content of at least 0.005%, particularly at least 0.03% by weight of the margarine product.

A suitable upper limit for the proteose-peptone content is 1.5% by weight of the margarine, preferably at most 1.0%.

In this Specification by "margarines" are understood emulsions, containing an aqueous phase of a pH value of about 4-7 and 50-95%, preferably 75-85% of fat. Such margarines can either be pourable or plastic at ambient temperature depending on the type of margarine fat used, which may include natural oils and fats that are liquid, semi-liquid or solid at ambient temperature, butter fat, hydrogenated, fractionated and interesterified oils and fats or mixtures thereof.

Proteins are frequently incorporated in the aqueous phase of margarines, particularly for providing it with valued culinary properties. Milk, skim-milk, buttermilk or whey have often been used in preparing proteinaceous aqueous ingredients for margarine preparation. Inocculation of a proteinaceous aqueous phase by suitable cultures results in ripening of the aqueous phase and the development of highly valued flavouring ingredients. The emulsifying properties of such proteins under conventional acid pH conditions of margarines are however either insufficient, or totally absent, and often even counteracting, because of the hydrophylic properties of proteins, and consequently all sorts of additional water-in-oil promoting emulsifying agents have been used, e.g. phosphatides, partial glycerides, synthetic emulsifiers etc. Such water-in-oil type emulsifiers are of importance for improving the stability of the margarine during storage and preparation and also for improving its frying properties.

Since effective reduction of spattering of margarines has so far essentially been achieved by the incorporation of high proportions of salt and/or emulsifiers, particularly phosphatides, it is all the more surprising that the selected proteins, which are ineffective emulsifiers for water-in-oil type margarines, effectively improve the frying and anti-spattering properties of margarines, even those which contain no or only a little amount of salt.

Similar favourable anti-spattering effects are to be expected in margarines of a very high salt content, particularly those which have a rather coarse water distribution.

Preferably margarines are prepared comprising cheese whey or concentrated cheese whey (i.e. whey of a solids content within the range of about 10-40%) from which substantial proportions of proteinaceous material of an isoelectric point within the range of pH 4-6 have been removed, so as to increase the weight ratio of proteose-peptone to proteinaceous material of an isoelectric point within the range of pH 4-6 to a value of at least 0.5, preferably from 0.8 to 1.2. Excellent products of a much higher ratio between these proteins than 1.2 can be prepared as well; however, increasing the ratio to a level above 1.2 requires further concentration of the proteose-peptone, e.g. through dialysis, which will make the protein concentrate much more expensive. In this Specification such cheese whey concentrates are indicated as "modified cheese whey concentrates." The types of proteins that have at least partially been removed from cheese whey include for instance various caseins, α-lactalbumin, β-lactoglobulin, serum albumin etc.

In a preferred embodiment of the present invention a margarine is provided comprising a modified aqueous cheese whey concentrate of a proteose-peptone content of 1–10%, a salt content of 0–20% and a lactose content of 1–25% by weight of the modified cheese whey. Suitably a modified cheese whey concentrate is obtained by heating cheese whey to 90°–100° C. for about 20–60 minutes, acidifying it to a pH of about 4 to 5, and letting the proteins of an isoelectric point within the range of 4–6 precipitate and centrifuging the coagulated whey proteins. Subsequently the residue is concentrated to a solids content of over 50% and cooled to 5°–25° C. and crystallized lactose is then removed by centrifuging. The supernatant liquid can be used as such, dried or concentrated. Furthermore of the salts present and/or milk sugars can be removed, e.g. by electrodialysis, transport depletion, ultra-filtration, reverse osmosis or gel filtration.

The invention will now be illustrated by the following Examples (all percentages are by weight).

EXAMPLES I–V

Margarines were prepared as follows:

The margarine fat blend, consisting of 30 parts by weight of coconut oil, 30 parts of palm oil, 40 parts of hydrogenated soybean oil of a slip melting point of 28° C., was melted and emulsified with the aqueous phase shown in the accompanying Tables A, B and C. Monoglycerides and phosphatides were incorporated in the fat phase and water-in-oil type emulsions containing about 80% of fat were prepared therefrom.

The emulsion of fat and aqueous ingredients was crystallized and worked in a closed cooled tubular surface-scraped heat exchanger (Votator A-unit), to a temperature of about 15° C. The temperatures of the cooling medium in the A-unit were from −6° to −10° C. The crystallized emulsion was subsequently passed through an uncooled resting tube (Votator B-unit), where it crystallized further for 160 sec and was then packed and stored at 15° C.

The proteinaceous materials that were incorporated in the aqueous phase were:

a. skim-milk of a solids content of 8% including a total protein content of 3.2% by weight. The weight ratio of proteose-peptone to non-proteose pepton proteins was 0.04.

b. whey concentrate of a solids content of 26% including 13% of total proteins. The weight ratio of proteose-peptone to non-proteose-peptone proteins was 0.11.

c. modified whey concentrate, containing 60% water and 40% by weight of solids, i.e. 4% proteose-peptone, 4% non-proteose-peptone proteins of an isoelectric point within the range of 4–6, 12% salts and 20% other solids (essentially lactose) (ratio 1).

d. modified whey concentrate obtained by dialysing and freeze-drying of product c; the composition was: 75% proteose pepton, 10% nitrogen containing non-proteinaceous material, 1.7% lactose, 0.03% salt and the balance water (ratio 7.5).

The composition and frying properties of the margarines are compiled in the Tables A, B and C. The control examples show margarines outside the scope of the present invention.

The frying tests were performed as follows:

The margarines were subjected after 3 days' storage to the following spattering test: In an enamelled pan with a smooth bottom surface each time a sample of margarine was heated to 175° C. (controlled with a thermocouple). At some distance above the pan, the fat spattering away was caught on a piece of paper which had been weighed before. After the test the piece of paper was weighed again. The weight increase of the paper was a measure for the degree of spattering and was converted into a score. (For all experiments the same pan and identical procedures were followed).

The equipment used for the spattering test consisted of:

A hot-plate—Diameter 180 mm, 110 or 220 volts; three switch positions, 240, 960, 1200 Watt.

An enamelled frying-pan—Diameter, bottom 180 mm, top 240 mm; thickness bottom 5 mm, side wall 2 mm.

A stand for paper—To hold a paper, 360 mm×360 mm, at a distance of 220 mm from the hot plate.

Prior to starting the frying tests, the apparatus was heated up as follows:

The pan was placed on the hot-plate, and the plate was switched to position 3 (high). After 2½ minutes, 50 g margarine was put in the pan. The hot-plate was switched to position 1 (low) after 1 minute (the margarine has nearly melted). At position 1 the sample was fried till the last traces of water were evaporated (frying time 4–6 minutes). The plate was then switched to position 0 (off), and the contents of the pan poured on a plate. The pan was then wiped quickly with a dry cloth to remove all traces of fat and residue. The experiments were proceeded immediately so that the temperature of the pan remained between correct limits.

The measured degree of spattering and the visual assessment correlate as follows:

| Visual assessment | | mg 50g margarine |
|---|---|---|
| 10 = very good | anti-spattering behaviour | = less than 10 mg |
| 8–9 = good | " | = 10–50 mg |
| 6–7 = moderate | " | = 50–150 mg |
| 4–5 = satisfactory | " | = 150–500 mg |
| 2–3 = very bad | " | = 500 mg. |

Intermediate scores are based upon visual assessment only.

EXAMPLES VI–XIII

Similarly as described in the previous Examples margarines were prepared, however free from whey concentrate b.

From the results, which are summarised in Table D, it follows that replacement of either water or milk solids from buttermilk by product c results in significant improvement of anti-spattering characteristics.

(In Table D all percentages are expressed by weight and calculated on the total weight of the margarine).

EXAMPLE XIV

A liquid margarine was prepared in a conventional way from the aqueous phase of Example X; the fat phase consisted of 98% sunflower oil and 2% of fully hydrogenated rapeseed oil of a melting point of 70%. The spattering value was 9.

EXAMPLES XV-XVII

Similarly as described in the previous Examples margarines were prepared containing product c or product d.

From these Examples it follows that the favourable effect of proteose-peptone is independent of the nature of the phosphatides used. Furthermore it is shown that proteose-peptone is effective at high concentrations as well.

The relevant data are compiled in Table E.

TABLE A

| Example | Control | | I | |
|---|---|---|---|---|
| Ingredients | grams | % by wt. | grams | % by wt. |
| Fat blend | 1000 | 82.21 | 1000 | 82.21 |
| Monoglycerides of fully hardened palm oil | 1 | 0.08 | 1 | 0.08 |
| Soyabean phosphatides | 3 | 0.25 | 3 | 0.25 |
| Whey concentrate (26% solids) | 18 | 1.48 | 0 | 0 |
| Product c | 0 | 0 | 18 | 1.48 |
| Skim-milk (8% solids) | 6 | 0.49 | 6 | 0.49 |
| NaCl solution (25%) | 47 | 3.86 | 47 | 3.86 |
| Water | 140 | 11.51 | 140 | 11.51 |
| Na-benzoate | 1.4 | 0.12 | 1.4 | 0.12 |
| pH | 4.3 | | 4.3 | |
| total | 1216.4 | 100.0 | 1216.4 | 100.0 |
| Whey protein | 0.608 | 0.050 | — | — |
| Milk protein | 0.192 | 0.016 | 0.192 | 0.016 |
| Protein from c | — | — | 1.440 | 0.059 |
| total protein | 0.800 | 0.066 | 1.632 | 0.075 |
| Proteose-peptone from whey | 0.061 | 0.005 | — | — |
| from milk | 0.008 | 0.001 | 0.008 | 0.001 |
| from product c | — | — | 0.720 | 0.030 |
| total proteose-peptone | 0.069 | 0.006 | 0.728 | 0.031 |
| non-proteose-peptone proteins of isoelectric point within pH 4–6 | 0.731 | 0.060 | 0.904 | 0.043 |
| Ratio * | 0.09 | | 0.81 | |
| Spattering value | 7 | | 10 | |

\* Proteose-peptone
  Non-proteose-peptone protein of isoelectric point within pH 4–6 range.

Table B

| Example | Control | | II | |
|---|---|---|---|---|
| Ingredients | g | % | g | % |
| Fat blend | 1700 | 80.09 | 1700 | 80.09 |
| Monoglycerides of fully hardened palm oil | 2 | 0.09 | 2 | 0.09 |
| Soyabean phosphatides | 10 | 0.47 | 10 | 0.47 |
| Whey concentrate (26% solids) | 40 | 1.88 | 0 | 0 |
| Product c | 0 | 0 | 26 | 1.22 |
| Skim-milk (8% solids) | 30 | 1.41 | 30 | 1.41 |
| NaCl solution (25%) | 26 | 1.22 | 26 | 1.22 |
| Water | 312 | 14.70 | 326 | 15.36 |
| Na-benzoate | 2.7 | 0.13 | 2.7 | 0.13 |
| pH | 4.5 | | 4.5 | |
| total | 2122.7 | 99.99 | 2122.7 | 99.99 |
| Whey protein | 1.35 | 0.064 | 0 | 0 |
| Milk protein | 0.96 | 0.045 | 0.96 | 0.045 |
| Protein from c | — | — | 2.08 | 0.098 |
| total protein | 2.31 | 0.109 | 3.04 | 0.143 |
| Proteose-peptone from whey | 0.135 | 0.006 | — | — |
| from milk | 0.038 | 0.002 | 0.038 | 0.002 |
| from product c | — | — | 1.040 | 0.049 |
| total proteose peptone | 0.173 | 0.008 | 1.078 | 0.051 |
| non-proteose-peptone proteins of isoelectric point within pH 4–6 | 2.14 | 0.101 | 1.96 | 0.092 |
| Ratio * | 0.08 | | 0.55 | |
| Spattering value | 6½ | | 8 | |

\* Proteose-peptone
  Non-proteose-peptone protein of isoelectric point within pH 4–6 range.

Table C

| Example | Control | | III | | IV | | V | |
|---|---|---|---|---|---|---|---|---|
| Ingredients | g | % | g | % | g | % | g | % |
| Fat blend | 1000.00 | 82.71 | 1000.00 | 82.72 | 1000.00 | 82.71 | 1000.00 | 82.71 |
| Monoglycerides of fully hardened palm oil | 1.00 | 0.08 | 1.00 | 0.08 | 1.00 | 0.08 | 1.00 | 0.08 |
| Soya phosphate fraction | 1.90 | 0.16 | 1.90 | 0.16 | 1.90 | 0.16 | 1.90 | 0.16 |
| Citric acid | 0.80 | 0.07 | 0.80 | 0.07 | 0.80 | 0.07 | 0.80 | 0.07 |
| Na-benzoate | 1.37 | 0.11 | 1.37 | 0.11 | 1.37 | 0.11 | 1.37 | 0.11 |
| Whey concentrate (26% solids) | 50.00 | 4.14 | 50.00 | 4.14 | 25.00 | 2.07 | — | — |
| Skim-milk (8% solids) | 20.00 | 1.65 | — | — | 20.00 | 1.65 | 20.00 | 1.65 |

Table C-continued

| Example | Control | | III | | IV | | V | |
|---|---|---|---|---|---|---|---|---|
| Ingredients | g | % | g | % | g | % | g | % |
| Product of | — | — | 0.80 | 0.07 | 1.10 | 0.09 | 2.10 | 0.17 |
| Glucose | — | — | — | — | 5.40 | 0.45 | 10.80 | 0.89 |
| Water | 134.00 | 11.08 | 153.00 | 12.66 | 152.50 | 12.61 | 171.00 | 14.14 |
| pH | 4.2 ± 0.1 | | 4.2 ± 0.1 | | 4.2 ± 0.1 | | 4.2 ± 0.1 | |
| total | 1209.07 | 100.00 | 1208.87 | 100.01 | 1209.07 | 100.00 | 1208.97 | 99.98 |
| Whey protein | 1.69 | 0.140 | 1.69 | 0.140 | 0.85 | 0.070 | — | — |
| Milk protein | 0.72 | 0.059 | — | — | 0.72 | 0.059 | 0.72 | 0.059 |
| Protein from d | — | — | 0.60 | 0.046 | 0.83 | 0.068 | 1.58 | 0.128 |
| total protein | 2.41 | 0.199 | 2.29 | 0.186 | 2.40 | 0.197 | 2.30 | 0.187 |
| Proteose-peptone | | | | | | | | |
| from whey | 0.17 | 0.014 | 0.17 | 0.014 | 0.09 | 0.007 | — | — |
| from milk | 0.03 | 0.002 | — | — | 0.03 | 0.002 | 0.03 | 0.002 |
| from product d | — | — | 0.60 | 0.046 | 0.83 | 0.068 | 1.58 | 0.128 |
| total proteose-peptone | 0.20 | 0.016 | 0.77 | 0.060 | 0.95 | 0.077 | 1.61 | 0.130 |
| non-proteose-peptone proteins of isoelectric point within pH 4–6 | 2.21 | 0.183 | 1.52 | 0.126 | 1.45 | 0.120 | 0.69 | 0.057 |
| Ratio * | 0.09 | | 0.51 | | 0.66 | | 2.33 | |
| Spattering value | 6 | | 7.5 | | 8 | | 10 | |

\* Proteose-peptone
 Non-proteose-peptone protein of isoelectric point within pH 4–6 range.

Table D

| Ex. | Control | VIII | IX | X | Cont. | Cont. | Cont. | Cont. |
|---|---|---|---|---|---|---|---|---|
| fat blend | 81.0 | 81.0 | 81.0 | 81.0 | 81.0 | 81.0 | 81.0 | 80.7 |
| monoglyceride of fully hydrogenated palm oil | 0.1 | 0.1 | 0.1 | 0.1 | 0.1 | 0.1 | 0.1 | 0.1 |
| soyabean phosphatides | 0.3 | 0.3 | 0.3 | 0.3 | 0.3 | 0.3 | 0.3 | 0.6 |
| prod. c | 0 | 0.4 | 0.8 | 1.6 | 0 | 0 | 0 | 0 |
| buttermilk | 0 | 0 | 0 | 0 | 2.0 | 4.0 | 8.0 | 0 |
| NaCl | 0.4 | 0.4 | 0.4 | 0.4 | 0.4 | 0.4 | 0.4 | 0.4 |
| Water | 18.2 | 17.8 | 17.4 | 17.0 | 16.2 | 14.2 | 10.2 | 18.2 |
| pH | 4.5 | 4.5 | 4.5 | 4.5 | 4.5 | 4.5 | 4.5 | 4.5 |
| Spattering value (score) | 6 | 8 | 10 | 10 | 5 | 5 | 4 | 7 |

| Ex. | XI | XII | XIII | Cont. | Cont. | Cont. | XIV | XV | Cont. | Cont. |
|---|---|---|---|---|---|---|---|---|---|---|
| fat blend | 80.7 | 80.7 | 80.7 | 80.7 | 80.7 | 80.7 | 81.0 | 81.0 | 81.0 | 81.0 |
| monoglyceride of fully hydrogenated palm oil | 0.1 | 0.1 | 0.1 | 0.1 | 0.1 | 0.1 | 0.1 | 0.1 | 0.1 | 0.1 |
| soyabean phosphatides | 0.6 | 0.6 | 0.6 | 0.6 | 0.6 | 0.6 | 0.3 | 0.3 | 0.3 | 0.3 |
| prod. c | 0.4 | 0.8 | 1.6 | 0 | 0 | 0 | 0 | 0.4 | 0.8 | 0 | 0 |
| buttermilk | 0 | 0 | 0 | 2.0 | 4.0 | 8.0 | 0 | 0 | 0 | 2.0 | 4.0 |
| NaCl | 0.4 | 0.4 | 0.4 | 0.4 | 0.4 | 0.4 | 0.8 | 0.8 | 0.8 | 0.8 | 0.8 |
| Water | 17.8 | 17.4 | 17.0 | 16.2 | 14.2 | 10.2 | 17.8 | 17.4 | 17.0 | 15.8 | 13.8 |
| pH | 4.5 | 4.5 | 4.5 | 4.5 | 4.5 | 4.5 | 4.5 | 4.5 | 4.5 | 4.5 | 4.5 |
| Spattering value | 7½ | 10 | 10 | 6 | 6½ | 6 | 7 | 9 | 10 | 8 | 7 |

TABLE E

| Example | Contr. | XVII | Contr. | XVIII | Contr. | XIX | Contr. | XX |
|---|---|---|---|---|---|---|---|---|
| Ingredients | (%) | (%) | (%) | (%) | (%) | (%) | (%) | (%) |
| Fat blend | 79.76 | 79.76 | 82.00 | 82.00 | 82.00 | 82.00 | 84.00 | 84.02 |
| Monoglycerides of fully hardened palm oil | 0.08 | 0.08 | 0.08 | 0.08 | 0.08 | 0.08 | 0.08 | 0.08 |
| Soyabean phosphatides | — | — | — | — | 0.15 | 0.15 | 0.30 | 0.30 |
| Enzymatically hydrolysed soyabean phosphatides | — | — | 0.15 | 0.15 | — | — | — | — |
| Soyabean phosphatides fractionated according to GB 1,113,241 | 0.16 | 0.16 | — | — | — | — | — | — |
| Whey concentrate (26% solids) | — | — | 7.69 | — | — | — | — | — |
| Skim-milk (8% solids) | — | — | 1.00 | — | — | — | — | — |
| Skim-milk powder | 4.00 | — | — | — | — | — | — | — |
| Product d | — | 1.86 | — | — | — | — | — | — |
| Product c | — | — | — | 7.63 | — | 1.00 | — | 4.38 |
| Soyabean protein | — | — | — | — | — | — | 0.50 | — |
| NaCl | — | — | 0.40 | 0.40 | 0.40 | 0.40 | 0.40 | 0.40 |
| Glucose | — | 2.16 | — | — | — | — | — | — |
| Water | 16.00 | 16.00 | 8.68 | 9.74 | 17.37 | 16.37 | 14.72 | 10.84 |
| pH (acidified with citric acid) | 4.3 | 4.3 | 5.2 | 5.2 | 4.5 | 4.5 | 4.3 | 4.3 |
| Spattering value | 6 | 7 | 6 | 7 | 7½ | 9 | 7 | 10 |

We claim:

1. An improved margarine of the type comprising a water-in-oil emulsion, the improvement comprising: having in the aqueous phase of said emulsion a protein material, wherein,
   (a) said protein material is a dairy protein and has a weight ratio of proteose peptone protein to pH 4 to 6 isoelectric point proteinaceous material of at least 0.5; and
   (b) said protein material is present at a level to provide at least 0.005 percent by weight of said margarine of proteose peptone protein, the improvement thereby providing for reduced spattering characteristics when said margarine is used for frying.

2. An improved margarine according to claim 1 wherein said weight ratio is 0.8 to 1.2.

3. An improved margarine according to claim 1 wherein said dairy protein is derived from cow's milk.

4. An improved margarine according to claim 1 wherein said dairy protein is derived from cheese whey.

5. An improved margarine according to claim 1 wherein said proteose peptone protein content is no greater than 1.5 percent.

6. An improved margarine according to claim 1 wherein said proteose peptone protein content is no greater than 1.0 percent.

7. An improved margarine according to claim 4 wherein said dairy protein is a cheese whey protein from which substantial portions of lactose and proteinaceous material of an isoelectric point of pH 4 to 6 removed therefrom.

8. An improved margarine according to claim 7 wherein said cheese whey protein is a cheese whey concentrate having a proteose peptone protein content of 1 to 10 percent, a salt content of 0 to 20 percent and a lactose content of 1 to 25 percent.

* * * * *